(12) United States Patent
Kawakami

(10) Patent No.: US 12,079,107 B2
(45) Date of Patent: Sep. 3, 2024

(54) COMPUTER READABLE STORAGE MEDIUM, DEBUGGING SUPPORT DEVICE, DEBUGGING SUPPORT METHOD, AND MACHINE LEARNING DEVICE

(71) Applicant: Mitsubishi Electric Corporation, Tokyo (JP)

(72) Inventor: Yuta Kawakami, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/266,814

(22) PCT Filed: Mar. 2, 2021

(86) PCT No.: PCT/JP2021/007985
§ 371 (c)(1),
(2) Date: Jun. 13, 2023

(87) PCT Pub. No.: WO2022/185418
PCT Pub. Date: Sep. 9, 2022

(65) Prior Publication Data
US 2024/0037016 A1    Feb. 1, 2024

(51) Int. Cl.
*G06F 11/00*  (2006.01)
*G06F 11/36*  (2006.01)

(52) U.S. Cl.
CPC ...... *G06F 11/3656* (2013.01); *G06F 11/3636* (2013.01)

(58) Field of Classification Search
CPC ............. G06F 11/3664; G06F 11/3636; G06F 11/33656
See application file for complete search history.

(56) References Cited

U.S. PATENT DOCUMENTS

| 10,761,963 B2 * | 9/2020 | Huang ................ G06F 11/3636 |
| 2008/0250397 A1 * | 10/2008 | Dahms ................ G06F 11/3624 717/129 |

(Continued)

FOREIGN PATENT DOCUMENTS

| CN | 108153284 A | 6/2018 |
| JP | 2005-044316 A | 2/2005 |

(Continued)

OTHER PUBLICATIONS

International Search Report and Written Opinion mailed on May 18, 2021, received for PCT Application PCT/JP2021/007985, filed on Mar. 2, 2021, 8 pages including English Translation.

(Continued)

*Primary Examiner* — Charles Ehne
(74) *Attorney, Agent, or Firm* — XSENSUS LLP

(57) ABSTRACT

A debugging support program causes a computer to execute: a step of extracting, from a module program constituting a sequence program, a first variable assigned to an input to the module program and a second variable assigned to an output from the module program; a step of creating a verification item for verifying operation of the module program, the verification item including a first setting value set for the first variable and a second setting value set for the second variable; a step of verifying operation of the module program based on the verification item; and a step of outputting a result of verifying operation of the module program.

14 Claims, 15 Drawing Sheets

(56) References Cited

U.S. PATENT DOCUMENTS

2010/0088548 A1* 4/2010 Gulwani ............. G06F 11/3608
714/38.14
2018/0007082 A1* 1/2018 Ha .......................... G06F 21/50

FOREIGN PATENT DOCUMENTS

| | | |
|---|---|---|
| JP | 6150953 B2 | 6/2017 |
| JP | 2020-121338 A | 8/2020 |
| JP | 6833129 B1 | 2/2021 |
| WO | 2016/194099 A1 | 12/2016 |
| WO | 2021/210071 A1 | 10/2021 |

OTHER PUBLICATIONS

Notice of Reasons for Refusal mailed on Nov. 2, 2021, received for JP Application 2021-544246, 6 pages Including English Translation.
Decision to Grant mailed on Mar. 8, 2022, received for JP Application 2021-544246, 5 pages including English Translation.
Chinese Office Action issued Mar. 1, 2024, in corresponding Chinese Patent Application No. 202180088791.6 and an English machine translation thereof.

* cited by examiner

FIG.6

| No | LABEL NAME | DATA TYPE | CLASS |
|----|------------|-----------|-------------|
| 1  | label1     | BIT       | VAR_INPUT   |
| 2  | label2     | BIT       | VAR_OUTPUT  |

FIG.7

VERIFICATION PATTERN LIST

| VERIFICATION PATTERN NAME | VERIFICA-TION CLASS |
|---|---|
| VERIFICATION PATTERN 1 | NORMAL |
| VERIFICATION PATTERN 2 | ANOMALY |

VERIFICATION PATTERN 1 VERIFICATION ITEM LIST

| VERIFICATION ITEM NAME |
|---|
| VERIFICATION ITEM 1 |
| VERIFICATION ITEM 2 |

VERIFICATION PATTERN 2 VERIFICATION ITEM LIST

| VERIFICATION ITEM NAME |
|---|
| VERIFICATION ITEM 1 |

VERIFICATION PATTERN 1_VERIFICATION ITEM 1

INPUT DATA

| LABEL NAME | DATA TYPE | SETTING CLASS | INPUT VALUE |
|---|---|---|---|
| label1 | BIT | EQUAL TO FOLLOWING VALUE | ON |

OUTPUT DATA

| LABEL NAME | DATA TYPE | SETTING CLASS | OUTPUT VALUE |
|---|---|---|---|
| label2 | BIT | EQUAL TO FOLLOWING VALUE | ON |

VERIFICATION PATTERN 1_VERIFICATION ITEM 2

INPUT DATA

| LABEL NAME | DATA TYPE | SETTING CLASS | INPUT VALUE |
|---|---|---|---|
| label1 | BIT | EQUAL TO FOLLOWING VALUE | OFF |

OUTPUT DATA

| LABEL NAME | DATA TYPE | SETTING CLASS | OUTPUT VALUE |
|---|---|---|---|
| label2 | BIT | EQUAL TO FOLLOWING VALUE | OFF |

VERIFICATION PATTERN 2_VERIFICATION ITEM 1

INPUT DATA

| LABEL NAME | DATA TYPE | SETTING CLASS | INPUT VALUE |
|---|---|---|---|
| label1 | BIT | EQUAL TO FOLLOWING VALUE | OFF |

OUTPUT DATA

| LABEL NAME | DATA TYPE | SETTING CLASS | OUTPUT VALUE |
|---|---|---|---|
| label2 | BIT | EQUAL TO FOLLOWING VALUE | ON |

FIG.9

VERIFICATION PATTERN LIST SCREEN [MODULE A]

☐ VERIFICATION PATTERN LIST     [CREATE NEW]

| | | VERIFICATION PATTERN NAME | VERIFICATION CLASS | COMMENT | LAST UPDATE DATE AND TIME | SAVE LOCATION |
|---|---|---|---|---|---|---|
| 🖉 | × | PATTERN A | NORMAL | ○○○○○○○ | 2020/10/4 13:02:00 | XXXXXXXXX |
| 🖉 | × | PATTERN B | QUASI-NORMAL | ○○○○○○○ | 2020/10/4 13:02:01 | XXXXXXXXX |
| 🖉 | × | PATTERN C | ANOMALY | ○○○○○○○ | 2020/10/4 13:02:02 | XXXXXXXXX |

FIG.10

VERIFICATION PATTERN EDIT SCREEN

☐ BASIC SETTINGS

| PATTERN NAME | PATTERN A |
|---|---|
| VERIFICATION CLASS | NORMAL |
| COMMENT | ○○○○○○○○ |
| SAVE LOCATION | XXXXXXXXXX ... |

☐ VERIFICATION ITEM LIST     [CREATE NEW]

| | | VERIFICATION ITEM NAME | COMMENT | CREATION DATE AND TIME | CREATOR |
|---|---|---|---|---|---|
| 🖉 | × | NORMAL OPERATION 1 | △△△△△ | 2020/10/1 10:00:00 | YYYY |
| 🖉 | × | NORMAL OPERATION 2 | △△△△△ | 2020/10/1 10:12:00 | YYYY |
| 🖉 | × | NORMAL OPERATION 3 | △△△△△ | 2020/10/1 10:14:00 | YYYY |
| 🖉 | × | NORMAL OPERATION 4 | △△△△△ | 2020/10/1 10:42:00 | YYYY |
| 🖉 | × | NORMAL OPERATION 5 | △△△△△ | 2020/10/1 11:04:00 | YYYY |

[OK] [CANCEL]

FIG.11

VERIFICATION ITEM EDIT SCREEN ☒

☐ BASIC SETTINGS

| VERIFICATION ITEM NAME | NORMAL OPERATION 1 |
| --- | --- |
| COMMENT | △△△△△ |
| CREATOR NAME | YYYY |

[ ... ]

☐ VALUE SETTINGS

INPUT DATA

| LABEL NAME | DATA TYPE | COMMENT | SETTING CLASS | INPUT VALUE |
| --- | --- | --- | --- | --- |
| label1 | BIT | ××××× | EQUAL TO FOLLOWING VALUE | ON |
| label2 | BIT | ××××× | EQUAL TO FOLLOWING VALUE | ON |

OUTPUT DATA

| LABEL NAME | DATA TYPE | COMMENT | SETTING CLASS | OUTPUT VALUE |
| --- | --- | --- | --- | --- |
| label3 | WORD | ××××× | GREATER THAN FOLLOWING VALUE | 10 |
|  |  |  |  |  |

[ OK ] [ CANCEL ]

FIG.14

| No | CONTENT | VERIFICATION PATTERN | VERIFICA-TION ITEM |
|---|---|---|---|

☐VERIFICATION RESULT

VERIFICATION RESULT DISPLAY FIELD

☐VERIFICATION PATTERN

VERIFICATION PATTERN DISPLAY FIELD

COMPUTER READABLE STORAGE MEDIUM, DEBUGGING SUPPORT DEVICE, DEBUGGING SUPPORT METHOD, AND MACHINE LEARNING DEVICE

CROSS-REFERENCE TO RELATED APPLICATION

The present application is based on PCT filing PCT/JP2021/007985, filed Mar. 2, 2021, the entire contents of which are incorporated herein by reference.

FIELD

The present disclosure relates to a debugging support program, a debugging support device, a debugging support method, and a machine learning device for supporting debugging of a sequence program.

BACKGROUND

In factories in which factory automation (FA) is implemented, control devices such as programmable logic controllers (PLCs) are used. Control devices control the control target devices by executing sequence programs.

A sequence program includes a plurality of modules that are componentized programs. Hereinafter, modules which are components of a sequence program are referred to as module programs. In a module program, input labels and output labels are described. An input label is a variable assigned to an input to the module program from the outside of the module program. An output label is a variable assigned to an output from the module program to the outside of the module program. The module program includes an input label and an output label having a dependence relationship to each other. The dependence relationship is a relationship in which the value of the output label is determined depending on the value of the input label.

In debugging for verifying the operation of a sequence program, operation of module programs constituting the sequence program is verified. The operation of a module program is verified by inputting a value to the module program, executing the module program, and monitoring a value output from the module program.

Patent Literature 1 discloses a simulation support tool that extracts a variable for test input from a sequence program, generates an input value for test corresponding to the extracted variable, and gives an input signal to a PLC that executes the sequence program.

CITATION LIST

Patent Literature

Patent Literature 1: Japanese Patent Application Laid-open No. 2005-44316

SUMMARY

Technical Problem

According to the conventional technique disclosed in Patent Literature 1, an input value for verification can be set, whereas an output value expected from the set input value is not set. Therefore, the conventional technique is problematic in that it is not easy to verify the operation of the module program based on the monitored output value, and thus it is difficult to efficiently debug the sequence program.

The present disclosure has been made in view of the above, and an object thereof is to obtain a debugging support program for enabling efficient debugging of a sequence program.

Solution to Problem

To solve the above problem and achieve an object, a debugging support program according to the present disclosure is a debugging support program that causes a computer to function as a debugging support device that supports debugging of a sequence program to be executed by a control device. The debugging support program causes the computer to execute: a step of extracting, from a module program constituting the sequence program, a first variable assigned to an input to the module program and a second variable assigned to an output from the module program; a step of creating a verification item for verifying operation of the module program, the verification item including a first setting value specified for the first variable and a second setting value specified for the second variable; a step of verifying operation of the module program based on the verification item; and a step of outputting a result of verifying operation of the module program.

Advantageous Effects of Invention

A debugging support program according to the present disclosure can achieve the effect of enabling efficient debugging of a sequence program.

BRIEF DESCRIPTION OF DRAWINGS

FIG. 6 is a diagram illustrating the label names, data types, and classes of the labels included in the module program illustrated in FIGS. 4 and 5.

FIG. 7 is a diagram illustrating specific examples of verification patterns for debugging the module program according to the first embodiment.

FIG. 9 is a diagram illustrating an example of display of verification patterns by the verification pattern display editing unit illustrated in FIG. 2.

FIG. 10 is a diagram illustrating an example of an edit screen for a verification pattern implemented by the verification pattern display editing unit illustrated in FIG. 2.

FIG. 11 is a diagram illustrating an example of an edit screen for a verification item implemented by the verification item display editing unit illustrated in FIG.

FIG. 14 is a diagram illustrating an example of a verification result display screen implemented by the verification result display unit illustrated in FIG. 2.

DESCRIPTION OF EMBODIMENTS

Hereinafter, a debugging support program, a debugging support device, a debugging support method, and a machine learning device according to embodiments will be described in detail with reference to the drawings.

First Embodiment

Figure 1:
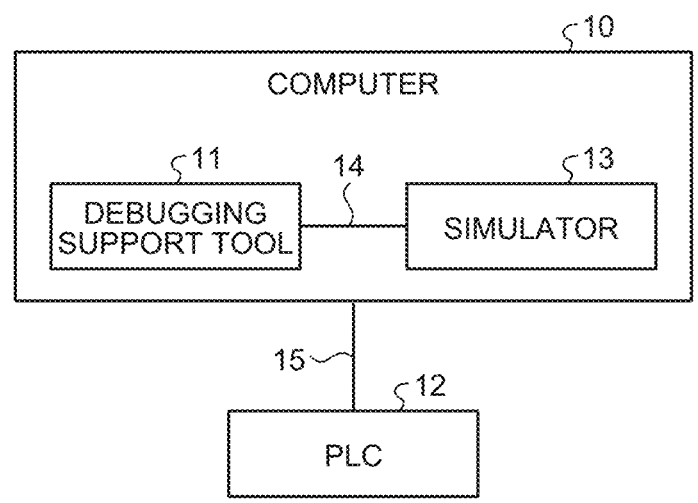
FIG. 1 is a diagram illustrating a debugging support device according to a first embodiment.

FIG. 1 is a diagram illustrating a debugging support device according to the first embodiment. The debugging support device is a computer 10 in which a debugging support tool 11 that is a debugging support program is installed. The computer 10 is a personal computer or a general-purpose computer. The debugging support device supports debugging of a sequence program to be executed by a PLC 12 that is a control device. The debugging support tool 11 is a program for supporting debugging of the sequence program.

For debugging the sequence program, the computer 10 is connected to the PLC 12. For the PLC 12 connected to the computer 10 during the debugging, only the power supply unit and the central processing unit (CPU) are connected to the base unit. The computer 10 verifies operation of a module program by writing the module program to the PLC 12 and causing the PLC 12 to execute the module program.

For verifying operation of the sequence program, a simulator 13 can be used instead of the PLC 12. The simulator 13 is an application that simulates the PLC 12 on the computer 10. The simulator 13 is installed in the computer 10. The computer 10 performs operation verification, that is, debugging, of the module program using either the PLC 12 or the simulator 13. Note that FIG. 1 illustrates both the PLC 12 connected to the computer 10 and the simulator 13 installed in the computer 10.

The computer 10 and the PLC 12 are connected to each other by a control network 15. The simulator 13 installed in the computer 10 is connected to the debugging support tool 11 by a virtual control network 14. The virtual control network 14 is a network that is based on the premise that the debugging support tool 11 and the simulator 13 are installed in the same computer 10. Note that the function of the debugging support tool 11 may be implemented as one functional module in another tool instead of being implemented as the debugging support tool 11.

The debugging support tool 11 specifies a value in advance for each of an input label and an output label included in the module program, and verifies whether the specified values can be obtained when the module program is executed.

In the state where the computer 10 is connected to the PLC 12 as illustrated in FIG. 1, the module program to be debugged is written to the PLC 12 by the debugging support tool 11. Alternatively, in the state where the simulator 13 is installed in the computer 10 as illustrated in FIG. 1, the module program to be verified is written to the simulator 13 by the debugging support tool 11.

The debugging support tool 11 rewrites the value of the input label in the module program to the value specified in the debugging support tool 11, and causes the PLC 12 or the simulator 13 to execute the module program. The value of the output label in the module program changes as a result of the execution of the module program. The debugging support tool 11 monitors the changed value, and compares the monitored value with the value specified in advance by the debugging support tool 11. The debugging support tool 11 determines whether the monitored value matches the value specified in advance or whether the monitored value does not match the value specified in advance. Through this determination, the debugging support tool 11 verifies the operation of the module program. The debugging support tool 11 outputs the verification result. The operator who has conducted the debugging can easily evaluate the debugging result from the verification result output from the debugging support tool 11.

Figure 2:
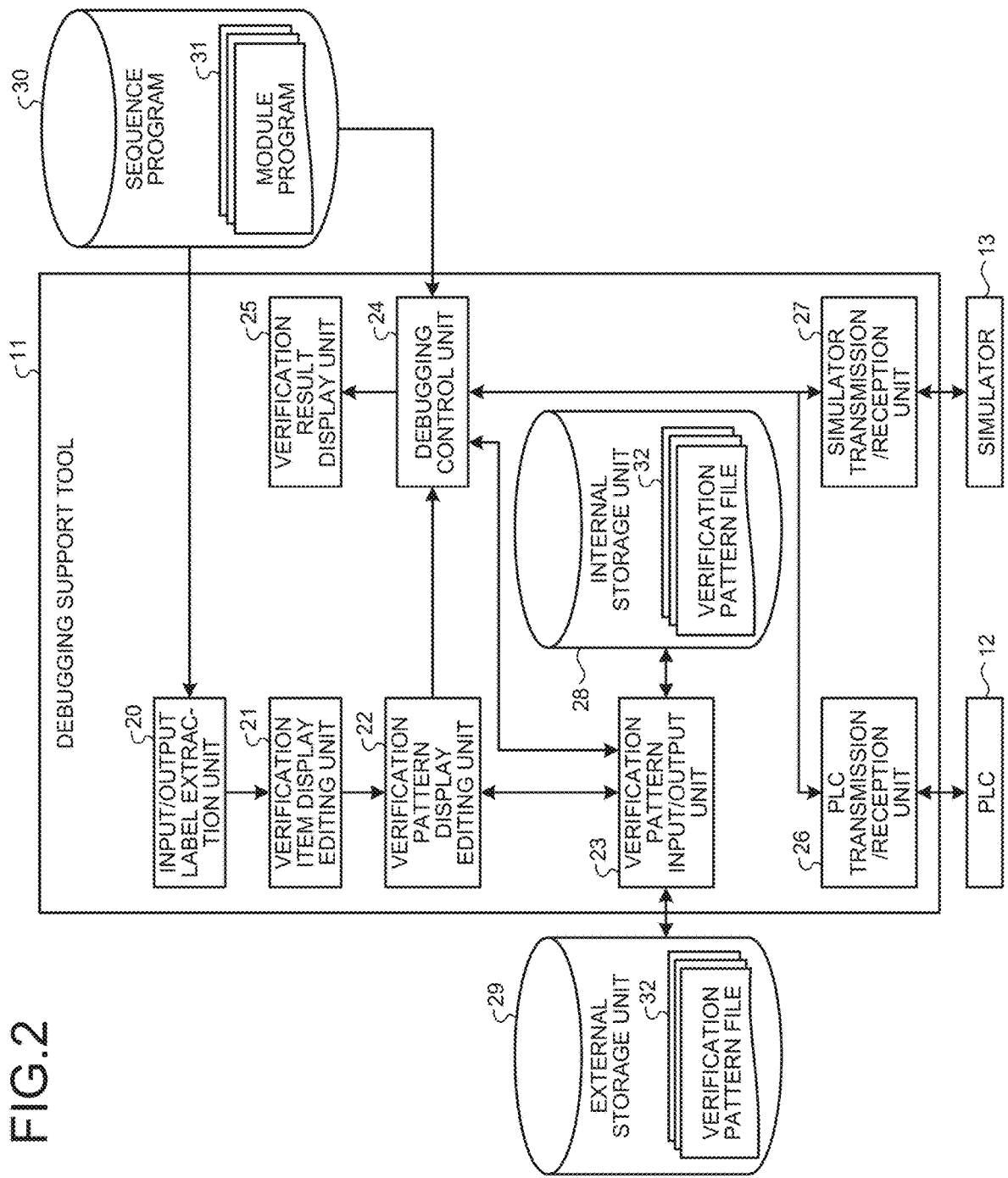
FIG. 2 is a diagram illustrating a functional configuration of the debugging support device according to the first embodiment.

FIG. 2 is a diagram illustrating a functional configuration of the debugging support device according to the first embodiment. The functional configuration of the debugging support device is implemented by the computer 10 executing the debugging support tool 11.

The debugging support tool 11 includes an input/output label extraction unit 20, a verification item display editing unit 21, a verification pattern display editing unit 22, a verification pattern input/output unit 23, a debugging control unit 24, a verification result display unit 25, a PLC transmission/reception unit 26, a simulator transmission/reception unit 27, and an internal storage unit 28.

The input/output label extraction unit 20 is an extraction unit that extracts an input label that is a first variable and an output label that is a second variable from a module program 31 included in a sequence program 30. The input label is a label assigned to an input to the module program 31. A value is input to the input label from the outside of the module program 31. The output label is a label assigned to an output from the module program 31. The value of the output label is output to the outside of the module program 31. The input/output label extraction unit 20 classifies the extracted labels into input labels and output labels.

The verification item display editing unit 21 is a verification item creation unit that creates a verification item for verifying operation of the module program 31. The verification item includes a group of a first setting value specified for the input label and a second setting value specified for the output label. The verification item display editing unit 21 specifies the first setting value and the second setting value. The verification item display editing unit 21 includes a group of the first setting value and the second setting value for the input label and the output label having a dependence relationship with each other. The dependence relationship is a relationship in which the value of the second variable is determined by the value of the first variable. The verification item display editing unit 21 displays verification items.

The verification pattern display editing unit 22 is a verification pattern creation unit that creates a verification pattern in which a plurality of verification items for verifying the operation of the module program 31 are grouped. The verification pattern display editing unit 22 manages verification patterns. The verification pattern display editing unit 22 also displays verification patterns.

A plurality of verification patterns are collected into a verification pattern file 32 which is stored in the internal storage unit 28 or an external storage unit 29. The internal storage unit 28 is a storage unit located inside the debugging support device. The external storage unit 29 is a storage unit located outside the debugging support device.

The verification pattern input/output unit 23 outputs the verification pattern file 32 to the internal storage unit 28 or the external storage unit 29. In addition, the verification pattern file 32 is input to the verification pattern input/output unit 23 from the internal storage unit 28 or the external storage unit 29.

The PLC transmission/reception unit 26 transmits information to the PLC 12 and receives information from the PLC 12. The PLC transmission/reception unit 26 writes a verification pattern and the module program 31 to the PLC 12, and causes the PLC 12 to execute the module program 31. The PLC transmission/reception unit 26 acquires the output value of the module program 31 when the module program 31 is being executed in the PLC 12.

The simulator transmission/reception unit 27 transmits information to the simulator 13, and receives information from the simulator 13. The simulator transmission/reception unit 27 writes a verification pattern and the module program 31 to the simulator 13, and causes the simulator 13 to execute the module program 31. The simulator transmission/reception unit 27 acquires the output value of the module program 31 when the module program 31 is being executed in the simulator 13.

The debugging control unit 24 controls the writing of the module program 31 and the input value specified in the verification pattern to the PLC 12 or the simulator 13, and the monitoring of the output value of the module program 31. The debugging control unit 24 also compares the monitored output value with the output value specified in the verification pattern, thereby verifying the operation of the module program 31. The verification result display unit 25 displays the result of the operation verification. The verification result display unit 25 is a verification result output unit that outputs a result of verifying the operation of the module program 31.

Figure 3:
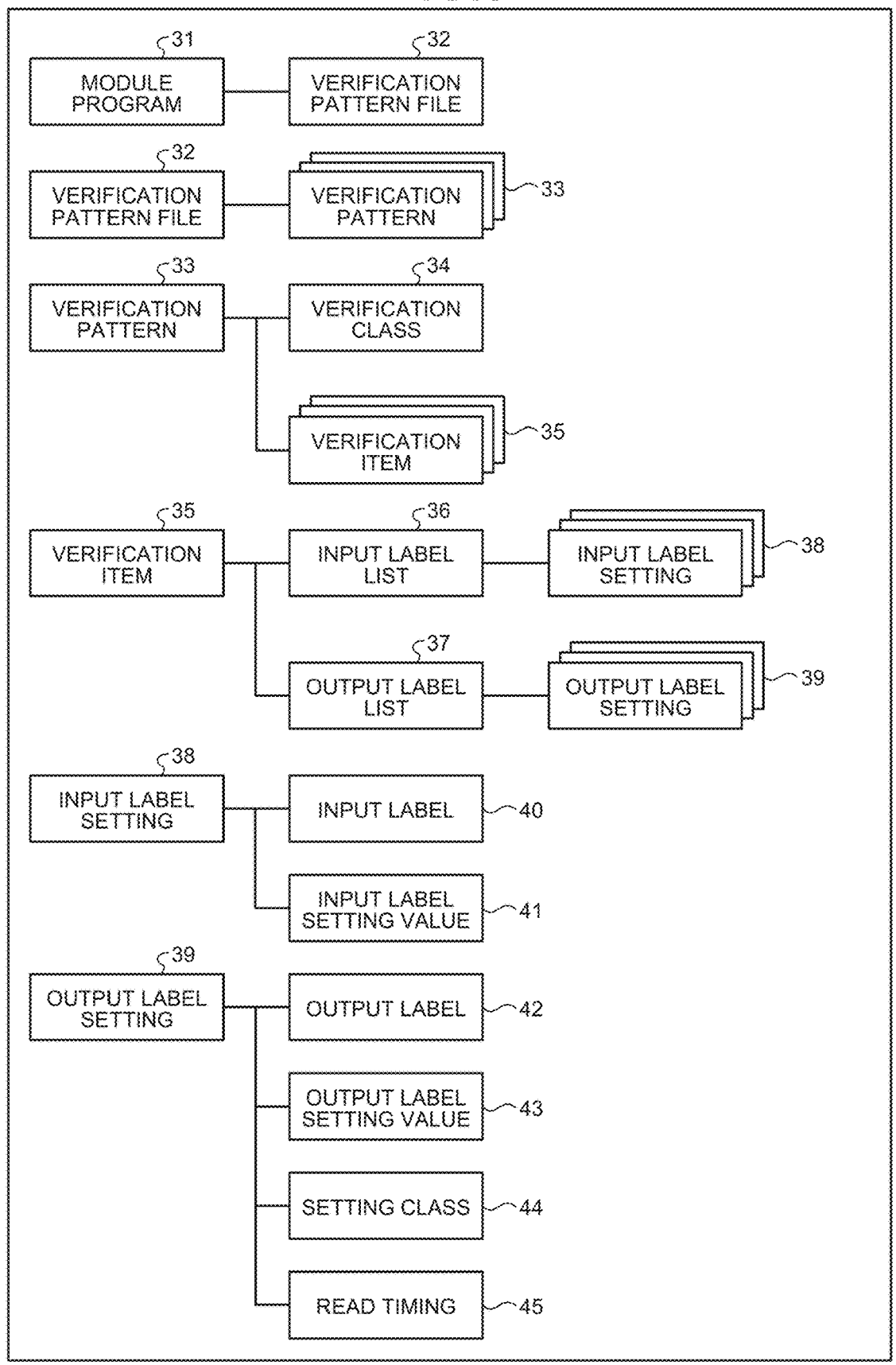
FIG. 3 is a diagram for explaining the configuration of a verification pattern file for use in operation verification of the module program illustrated in FIG. 2.

Next, the configuration of the verification pattern file 32 will be described. FIG. 3 is a diagram for explaining the configuration of the verification pattern file 32 for use in operation verification of the module program 31 illustrated in FIG. 2.

The verification pattern file 32 is a file in which a plurality of verification patterns 33 are grouped. The verification pattern file 32 is data for performing the operation verification of the module program 31. As illustrated in FIG. 3, one verification pattern file 32 is created for one module program 31.

The verification pattern 33 is data in which a plurality of verification items 35 are grouped. The verification pattern 33 is given a verification class 34, i.e. information representing the class of operation verification performed with the verification pattern 33. In other words, the verification class 34 is an attribute of the verification pattern 33. Operation verification is classified into a first verification that is verification of normal operation, a second verification that is verification of anomaly operation, and a third verification different from the first verification and the second verification. The third validation includes events that cannot be clearly classified into normal or anomaly. Such events include quasi-normal, which represents a value different from the normal one but can be treated as normal. The verification pattern 33 is given the verification class 34 indicating any one of the first verification, the second verification, and the third verification. The debugging control unit 24 performs operation verification according to the verification class 34 assigned to the verification pattern 33.

The verification item 35 includes an input label list 36 and an output label list 37. The input label list 36 is data in which a plurality of input label settings 38 are grouped. The output label list 37 is data in which a plurality of output label settings 39 are grouped.

The input label setting 38 is data in which an input label 40 extracted from the module program 31 and an input label setting value 41 are grouped. The input label setting value 41 is a first setting value set for the input label 40. The input label setting value 41 is written to the PLC 12 or the simulator 13 together with the module program 31 during the verification of operation of the module program 31. The input label setting value 41 is used for evaluating the output value of the module program 31 with respect to the input to the module program 31.

The output label setting 39 is data in which an output label 42 extracted from the module program 31, an output label setting value 43, a setting class 44, and a read timing 45 are grouped. The output label setting value 43 is a second setting value set for the output label 42. The setting class 44 is information indicating a method of comparing the output value of the module program 31 with the output label setting value 43 in the verification of operation. The debugging control unit 24 compares the output value of the module program 31 with the output label setting value 43 according to the setting class 44. Details of the setting class 44 will be described later. The read timing 45 is information indicating the timing at which the debugging support device reads the output value of the module program 31.

Figure 4:
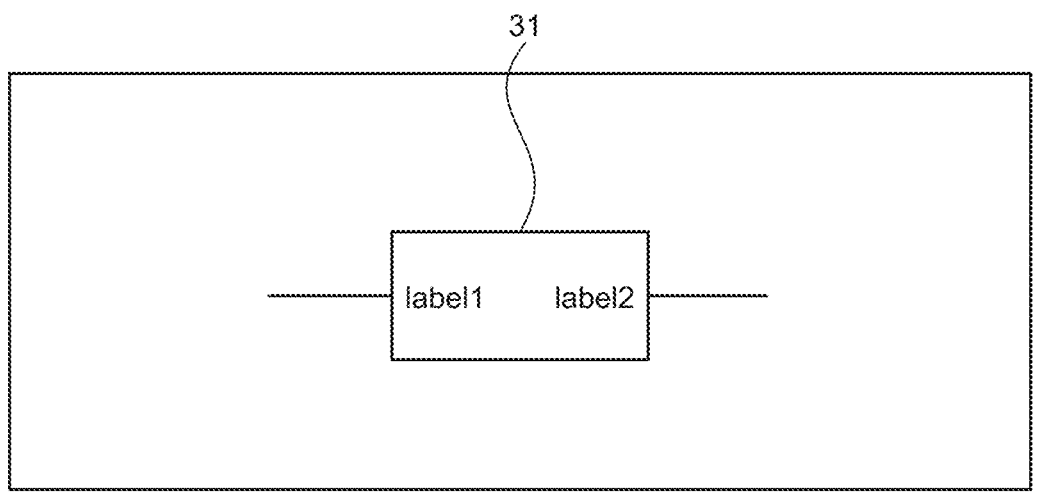
FIG. 4 is a first diagram illustrating an example of a module program to be debugged in the first embodiment.
Figure 5:
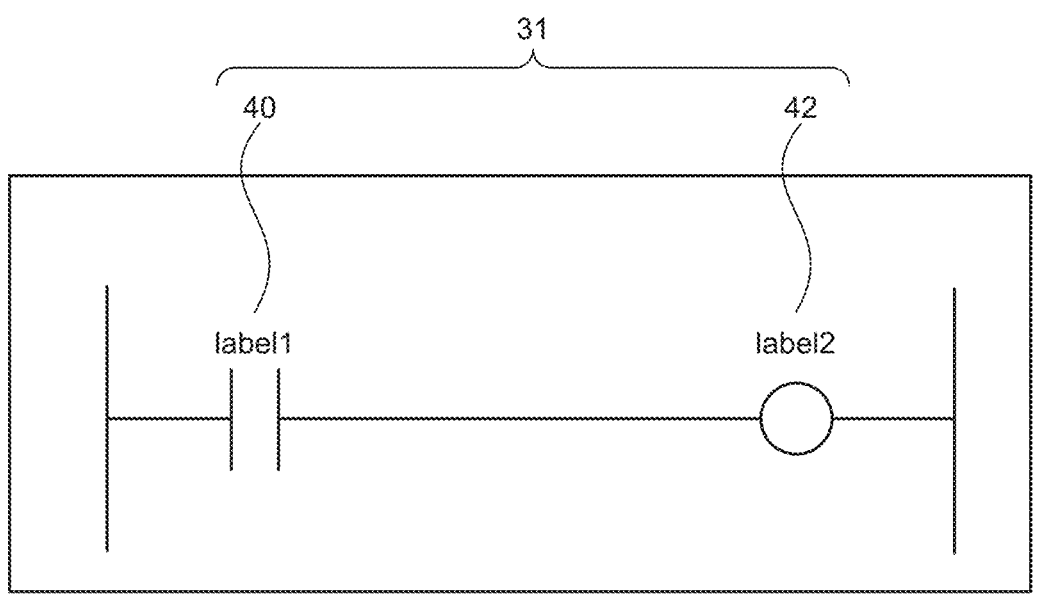
FIG. 5 is a second diagram illustrating an example of a module program to be debugged in the first embodiment.

FIG. 4 is a first diagram illustrating an example of a module program to be debugged in the first embodiment. FIG. 5 is a second diagram illustrating an example of a module program to be debugged in the first embodiment. The module program 31 is a component that is a function or a function block obtained by dividing the sequence program function by function. In the first embodiment, the module program 31 is a ladder program described using a ladder language. The module program 31 may be a program described in a language other than the ladder language.

The module program 31 illustrated in FIGS. 4 and 5 includes the input label 40 and the output label 42. FIG. 6 is a diagram illustrating the label names, data types, and classes of the labels included in the module program 31 illustrated in FIGS. 4 and 5. Both the input label 40 and the output label 42 are bit-type labels. The data type of labels illustrated in FIG. 6 is an example, and the data type of labels is not limited to the bit type. Whether a label is an input label or an output label is determined by the class of the label. A label with the class VAR_INPUT or VAR_IN_OUT is an input label. A label with the class VAR_OUTPUT, VAR_OUTPUT_RETAIN, or VAR_IN_OUT is an output label.

The module program 31 illustrated in FIGS. 4 and 5 is intended for a process of outputting a TRUE value to the output label 42 in response to a TRUE value input to the input label 40. The module program 31 illustrated in FIGS.

4 and 5 is also intended for a process of outputting a FALSE value to the output label 42 in response to a FALSE value input to the input label 40.

The verification pattern 33 for verifying whether the operation of the module program 31 illustrated in FIGS. 4 and 5 is normal needs to include the verification item 35 for verifying that the value of the output label 42 becomes a TRUE value in response to a TRUE value input to the input label 40, and the verification item 35 for verifying that the value of the output label 42 becomes a FALSE value in response to a FALSE value input to the input label 40. Alternatively, it is possible to determine whether or not the operation of the module program 31 is normal using the verification pattern 33 for verifying that the operation of the module program 31 is anomaly. For example, it is possible to determine that the operation is normal by verifying that the operation of the module program 31 is not anomaly using the verification item 35 for verifying that the value of the output label 42 becomes a TRUE value in response to a FALSE value input to the input label 40.

FIG. 7 is a diagram illustrating specific examples of verification patterns 33 for debugging the module program 31 according to the first embodiment. Here, an example in which two verification patterns 33 are created in order to verify normal operation and anomaly operation in the debugging of the module program 31 will be described.

"Verification pattern 1" illustrated in FIG. 7 is the verification pattern 33 for verifying normal operation. "Verification pattern 1" includes two verification items 35, "verification item 1" and "verification item 2". "Verification item 1" is the verification item 35 for verifying that the value of the output label 42 becomes a TRUE value in response to a TRUE value input to the input label 40. "Verification item 2" is the verification item 35 for verifying that the value of the output label 42 becomes a FALSE value in response to a FALSE value input to the input label 40. The debugging control unit 24 can determine that the operation of the module program 31 is normal when "verification item 1" and "verification item 2" are satisfied. Note that in FIG. 7, the TRUE value and the FALSE value are shown as "ON" and "OFF", respectively. In addition, "input data" illustrated in FIG. 7 represents data of the input label 40. "Output data" represents data of the output label 42.

"Verification pattern 2" illustrated in FIG. 7 is the verification pattern 33 for verifying anomaly operation. "Verification pattern 2" includes one verification item 35, "verification item 1". "Verification item 1" is the verification item 35 for verifying that the value of the output label 42 becomes a TRUE value in response to a FALSE value input to the input label 40. The debugging control unit 24 can determine that the operation of the module program 31 is anomaly when "verification item 1" is satisfied.

FIG. 7 illustrates the "label name", "data type", "setting class", and "input value" of the input label 40 and the "label name", "data type", "setting class", and "output value" of the output label 42 for each of "verification item 1" and "verification item 2" of "verification pattern 1" and "verification item 1" of "verification pattern 2". "Input value" is the input label setting value 41. "Output value" is the output label setting value 43.

For the input label 40, "equal to following value" shown in the field of "setting class" indicates that the setting class 44 means that the value is equal to a value described in the field next to the field of "setting class", that is, the input label setting value 41. For the output label 42, "equal to following value" shown in the field of "setting class" indicates that the setting class 44 means that the value is equal to the output label setting value 43. In addition to "equal to following value", the setting class 44 can be set as "not equal to following value", "other than following value", "greater than following value", "less than following value", "greater than or equal to following value", "less than or equal to following value", etc.

Figure 8:
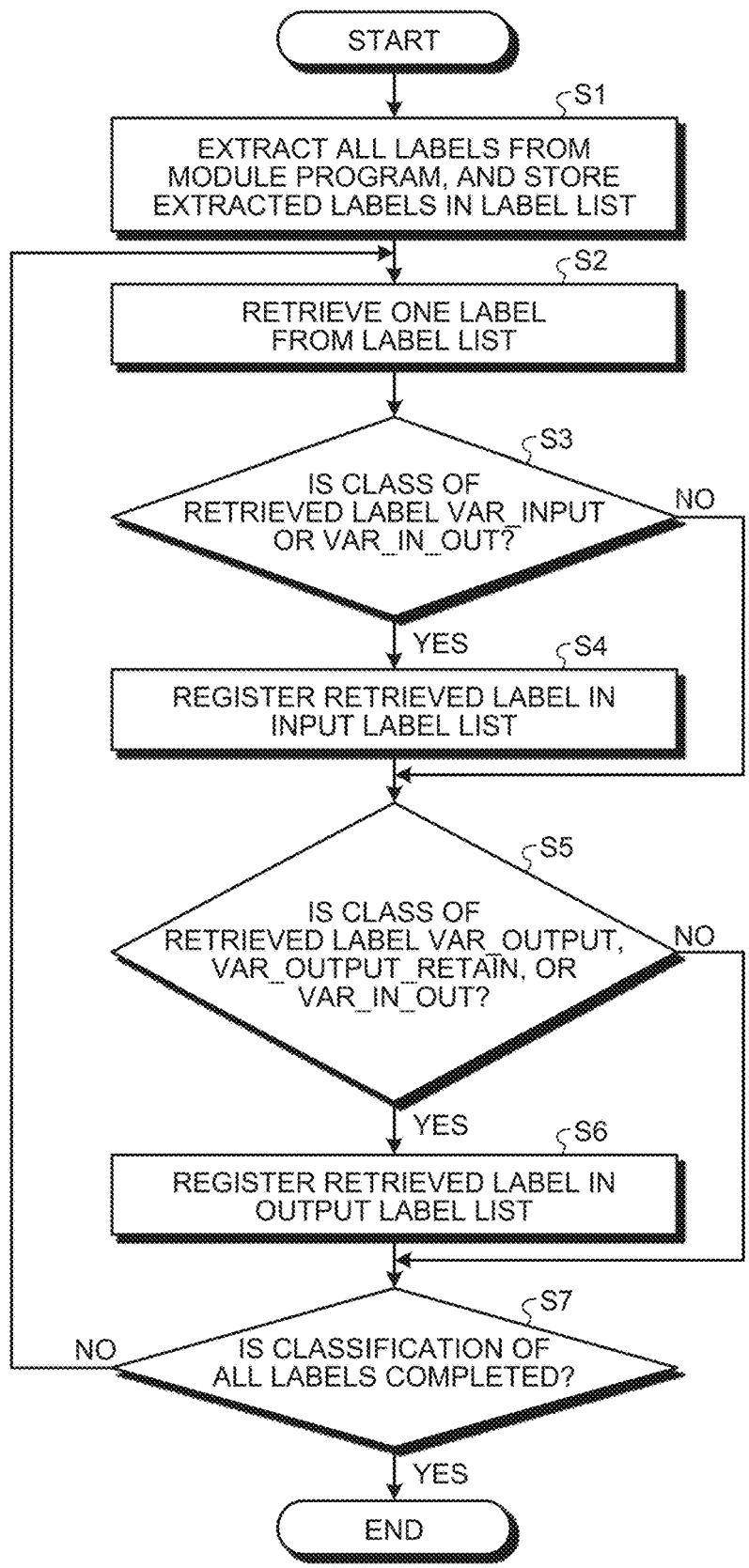
FIG. 8 is a flowchart illustrating a procedure for the operation of the input/output label extraction unit illustrated in FIG. 2.

Next, label extraction by the input/output label extraction unit 20 will be described. FIG. 8 is a flowchart illustrating a procedure for the operation of the input/output label extraction unit 20 illustrated in FIG. 2.

In step S1, the input/output label extraction unit 20 extracts all the labels from the module program 31, and stores the extracted labels in a label list. The label list is data in which the extracted labels are grouped. As a method for extracting labels, the method described in Patent Literature 1 can be adopted. The method for extracting labels may be a method other than the method in Patent Literature 1.

In step S2, the input/output label extraction unit 20 retrieves one label from the label list. In step S3, the input/output label extraction unit 20 determines whether the class of the retrieved label is VAR_INPUT or VAR_IN_OUT. That is, the input/output label extraction unit 20 determines whether the retrieved label is the input label 40.

In response to determining that the class of the retrieved label is VAR_INPUT or VAR_IN_OUT (step S3: Yes), the input/output label extraction unit 20 identifies the retrieved label as the input label 40. In this case, in step S4, the input/output label extraction unit 20 registers the retrieved label in the input label list 36. Thereafter, the input/output label extraction unit 20 advances the procedure to step S5.

On the other hand, in response to determining that the class of the retrieved label is not VAR_INPUT or VAR_IN_OUT (step S3: No), the input/output label extraction unit 20 determines that the retrieved label is not the input label 40. In this case, the input/output label extraction unit 20 advances the procedure to step S5.

In step S5, the input/output label extraction unit 20 determines whether the class of the retrieved label is VAR_OUTPUT, VAR_OUTPUT_RETAIN, or VAR_IN_OUT. That is, the input/output label extraction unit 20 determines whether the retrieved label is the output label 42.

In response to determining that the class of the retrieved label is VAR_OUTPUT, VAR_OUTPUT_RETAIN, or VAR_IN_OUT (step S5: Yes), the input/output label extraction unit 20 identifies the retrieved label as the output label 42. In this case, in step S6, the input/output label extraction unit 20 registers the retrieved label in the output label list 37. Thereafter, the input/output label extraction unit 20 advances the procedure to step S7.

On the other hand, in response to determining that the class of the retrieved label is not VAR_OUTPUT, VAR_OUTPUT_RETAIN, or VAR_IN_OUT (step S5: No), the input/output label extraction unit 20 advances the procedure to step S7.

In step S7, the input/output label extraction unit 20 determines whether the classification of all the extracted labels is completed. In response to determining that the classification of all the labels is not completed (step S7: No), the input/output label extraction unit 20 returns the procedure to step S2. The input/output label extraction unit 20 continues classifying labels by repeating the procedure from step S2. On the other hand, in response to determining that the classification of all the labels is completed (step S7: Yes), the input/output label extraction unit 20 ends the operation with the procedure illustrated in FIG. 8. In this manner, the input/output label extraction unit 20 extracts labels from the module program 31 and classifies the extracted labels.

Next, display of the verification patterns 33 by the verification pattern display editing unit 22 will be described. FIG. 9 is a diagram illustrating an example of display of the verification patterns 33 by the verification pattern display editing unit 22 illustrated in FIG. 2. FIG. 9 depicts an example of a window showing a list of the verification patterns 33 applied to the module program 31.

The verification pattern display editing unit 22 can switch the window displayed on the screen from one module program 31 to another. In addition, the operator can perform an editing work for creating a new verification pattern 33 through the window illustrated in FIG. 9. The newly created verification pattern 33 is stored in the internal storage unit 28 or the external storage unit 29.

FIG. 10 is a diagram illustrating an example of an edit screen for the verification pattern 33 implemented by the verification pattern display editing unit 22 illustrated in FIG. 2. The edit screen for the verification pattern 33 is opened when an operation for creating a new verification pattern 33 is performed on the window illustrated in FIG. 9. The operator can enter the name and the verification class 34 of the verification pattern 33 through the edit screen for the verification pattern 33. "Pattern name" illustrated in FIG. 10 is the name of the verification pattern 33.

A list of verification items 35 is displayed on the edit screen for the verification pattern 33. From the list of verification items 35, the operator can perform an edition for creating a new verification item 35 or changing an existing verification item 35. In addition, the operator can know the creation date and time, creator, and the like of the verification items 35 from the list of verification items 35.

FIG. 11 is a diagram illustrating an example of an edit screen for the verification item 35 implemented by the verification item display editing unit 21 illustrated in FIG. 2. The edit screen for the verification item 35 is opened when an operation for creating a new verification item 35 or an operation for changing an existing verification item 35 is performed on the edit screen for the verification pattern 33 illustrated in FIG. 10. The operator can enter the name of the verification item 35, the creator name of the verification item 35, the input label setting value 41, the output label setting value 43, and the like through the edit screen for the verification item 35.

Figure 12:
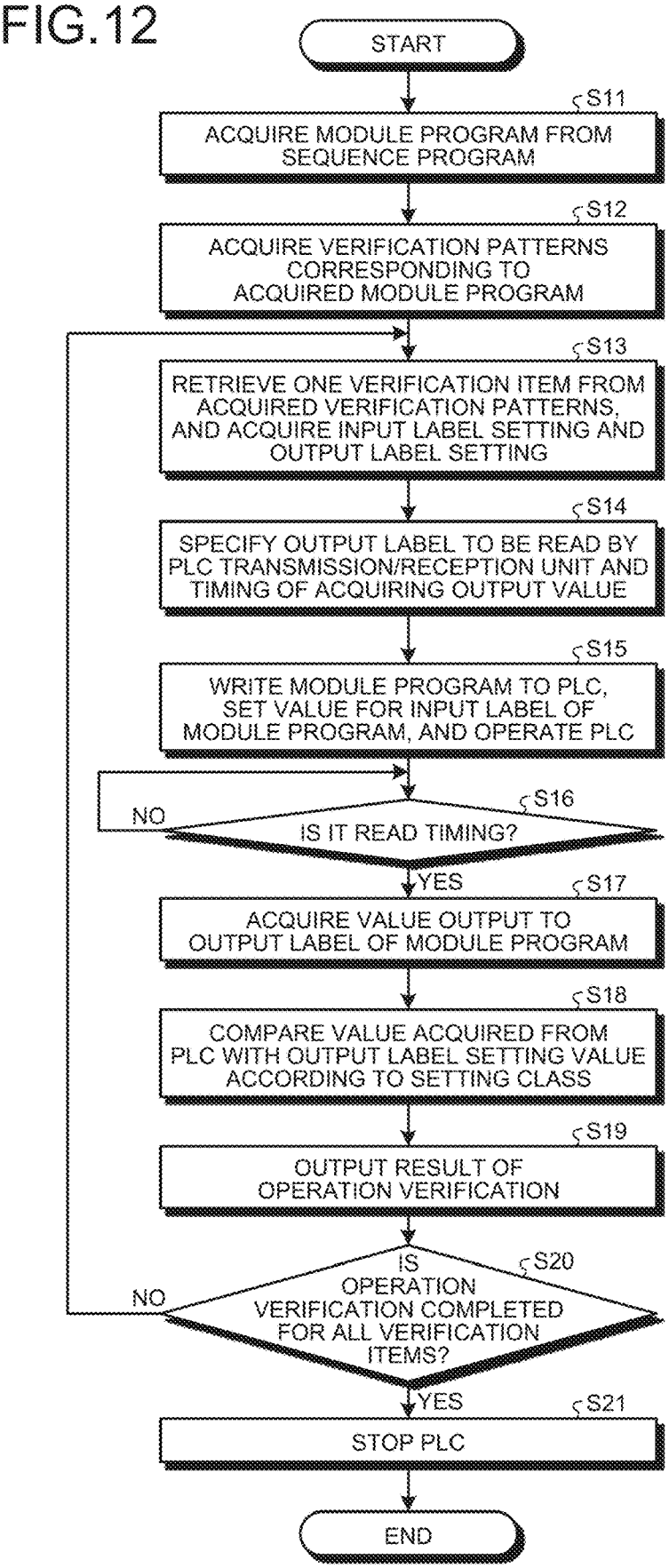
FIG. 12 is a first flowchart illustrating a procedure for the operation of the debugging control unit constituting the debugging support device according to the first embodiment.

Next, the operation of the debugging control unit 24 for debugging the module program 31 will be described. FIG. 12 is a first flowchart illustrating a procedure for the operation of the debugging control unit 24 constituting the debugging support device according to the first embodiment. FIG. 12 illustrates the operation procedure for performing the operation verification of the module program 31 by causing the PLC 12 to execute the module program 31.

In step S11, the debugging control unit 24 acquires the module program 31 to be debugged from the sequence program 30.

In step S12, the debugging control unit 24 acquires the verification patterns 33 corresponding to the acquired module program 31. Here, the debugging control unit 24 instructs the verification pattern input/output unit 23 to read the verification patterns 33 corresponding to the acquired module program 31. The verification pattern input/output unit 23 reads the verification pattern file 32 corresponding to the module program 31 from the internal storage unit 28 or the external storage unit 29 according to the instruction from the debugging control unit 24. The verification pattern input/output unit 23 sends the read verification pattern file 32 to the debugging control unit 24. In this manner, the debugging control unit 24 acquires the verification patterns 33 via the verification pattern input/output unit 23.

In step S13, the debugging control unit 24 retrieves one verification item 35 from the acquired verification patterns 33, and acquires the input label setting 38 and the output label setting 39. The debugging control unit 24 acquires the input label setting 38 from the input label list 36 included in the verification item 35. The debugging control unit 24 acquires the output label setting 39 from the output label list 37 included in the verification item 35.

In step S14, the debugging control unit 24 specifies the output label 42 to be read by the PLC transmission/reception unit 26 and the timing of acquiring the output value. The debugging control unit 24 specifies the output label 42 included in the output label setting 39 as the output label 42 to be read by the PLC transmission/reception unit 26. The debugging control unit 24 specifies the read timing 45 included in the output label setting 39 as the timing of acquiring the output value of the PLC 12 by the PLC transmission/reception unit 26.

In step S15, the debugging control unit 24 writes the module program 31 to the PLC 12, sets a value for the input label 40 of the module program 31, and operates the PLC 12. The debugging control unit 24 writes the module program 31 to the PLC 12 via the PLC transmission/reception unit 26. The debugging control unit 24 causes the input label setting value 41 included in the input label setting 38 to have the value of the input label 40 of the module program 31.

The debugging control unit 24 monitors the value of the output label 42 of the module program 31 executed by the PLC 12 via the PLC transmission/reception unit 26. In step S16, the debugging control unit 24 determines whether it is the specified read timing 45. When it is not the read timing 45 (step S16: No), the debugging control unit 24 waits until the read timing 45. In response to determining that it is the read timing 45 (step S16: Yes), the debugging control unit 24 advances the procedure to step S17.

In step S17, the debugging control unit 24 acquires the value output to the output label 42 of the module program 31. The debugging control unit 24 acquires the value of the output label 42 in the module program 31 from the PLC 12 via the PLC transmission/reception unit 26.

In step S18, the debugging control unit 24 compares the value acquired from the PLC 12 with the output label setting value 43 in accordance with the setting class 44. For the comparison, the debugging control unit 24 uses the output label setting value 43 included in the output label setting 39. The debugging control unit 24 performs the comparison according to the setting class 44 included in the output label setting 39. For example, if the setting class 44 is "equal to following value", the debugging control unit 24 compares the value acquired from the PLC 12 with the output label setting value 43 to determine whether the value acquired from the PLC 12 is the same as the output label setting value 43.

The debugging control unit 24 determines the result of the verification of operation based on the result of the comparison in step S18. The debugging control unit 24 obtains the result of the verification of operation according to the verification class 34 assigned to the verification pattern 33.

In step S19, the debugging control unit 24 outputs the result of the operation verification to the verification result display unit 25. The verification result display unit 25 displays the result of the verification of operation.

In step S20, the debugging control unit 24 determines whether the verification of operation is completed for all the verification items 35 of the verification patterns 33. If there is a verification item 35 for which operation verification has not been performed (step S20: No), the debugging control unit 24 returns the procedure to step S13, and performs the procedure of step S13 and subsequent steps on the verification item 35 for which verification of operation has not been performed. On the other hand, in response to determining that the operation verification is completed for all the verification items 35 (step S20: Yes), the debugging control unit 24 stops the PLC 12 in step S21. The debugging control unit 24 stops the PLC 12 by sending a stop command to the PLC 12 via the PLC transmission/reception unit 26. Thus, the debugging control unit 24 ends the operation with the procedure illustrated in FIG. 12.

Figure 13:
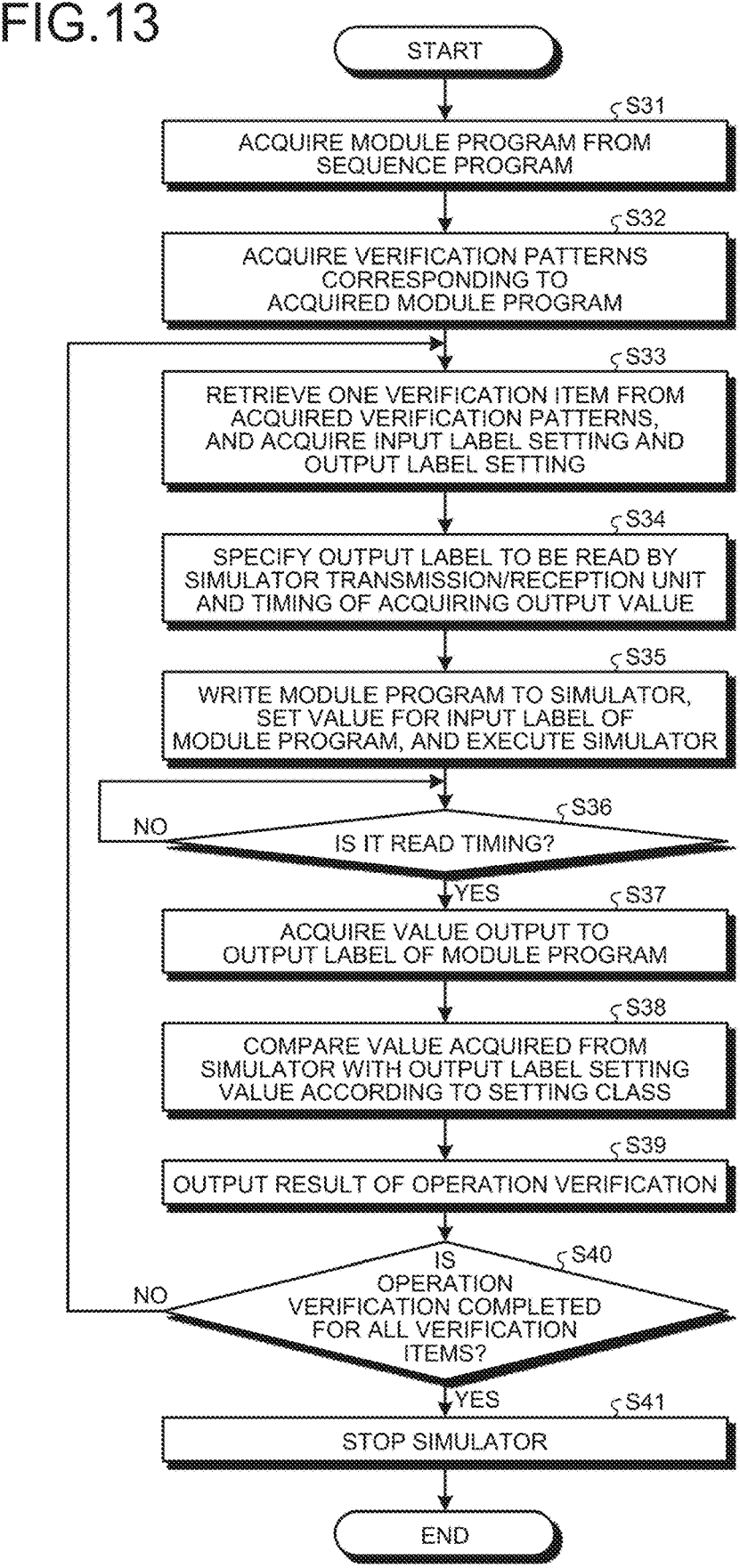
FIG. 13 is a second flowchart illustrating a procedure for the operation of the debugging control unit constituting the debugging support device according to the first embodiment.

FIG. 13 is a second flowchart illustrating a procedure for the operation of the debugging control unit 24 constituting the debugging support device according to the first embodiment. FIG. 13 illustrates the operation procedure for performing the operation verification of the module program 31 by causing the simulator 13 to execute the module program 31. Note that the procedure illustrated in FIG. 13 is based on the premise that the debugging support tool 11 and the simulator 13 have been installed in the same computer 10 and that the simulator 13 has been activated.

In step S31, the debugging control unit 24 acquires the module program 31 that is a debugging target from the sequence program 30. In step S32, the debugging control unit 24 acquires the verification patterns 33 corresponding to the acquired module program 31. Details of step S32 are similar to those of step S12 illustrated in FIG. 12.

In step S33, the debugging control unit 24 retrieves one verification item 35 from the acquired verification patterns 33, and acquires the input label setting 38 and the output label setting 39. Details of step S33 are similar to those of step S13 illustrated in FIG. 12.

In step S34, the debugging control unit 24 specifies the output label 42 that the simulator transmission/reception unit 27 reads, and the timing of acquiring the output value. The debugging control unit 24 sets the output label 42 included in the output label setting 39 as the output label 42 to be read by the simulator transmission/reception unit 27. The debugging control unit 24 sets the read timing 45 included in the output label setting 39, as the timing of acquiring the output value of the simulator 13 by the simulator transmission/reception unit 27.

In step S35, the debugging control unit 24 writes the module program 31 to the simulator 13, sets a value for the input label 40 of the module program 31, and executes the simulator 13. The debugging control unit 24 writes the module program 31 to the simulator 13 via the simulator transmission/reception unit 27. The debugging control unit 24 sets the input label setting value 41 included in the input label setting 38, as the value of the input label 40 of the module program 31.

The debugging control unit 24 monitors the value of the output label 42 of the module program 31 executed by the simulator 13 via the simulator transmission/reception unit 27. In step S36, the debugging control unit 24 determines whether it is the specified read timing 45. When determining that it is not the read timing 45 (step S36: No), the debugging control unit 24 waits until the read timing 45. In response to determining that it is the read timing 45 (step S36: Yes), the debugging control unit 24 advances the procedure to step S37.

In step S37, the debugging control unit 24 acquires the value output to the output label 42 of the module program 31. The debugging control unit 24 acquires the value of the output label 42 in the module program 31 from the simulator 13 via the simulator transmission/reception unit 27.

In step S38, the debugging control unit 24 compares the value acquired from the simulator 13 with the output label setting value 43 in accordance with the setting class 44. Details of step S38 are similar to those of step S18 illustrated in FIG. 12.

In step S39, the debugging control unit 24 outputs the result of the operation verification to the verification result display unit 25. The verification result display unit 25 displays the result of the operation verification.

In step S40, the debugging control unit 24 determines whether the operation verification is completed for all the verification items 35 of the verification patterns 33. If there is a verification item 35 for which verification of operation has not been performed (step S40: No), the debugging control unit 24 returns the procedure to step S33, and performs the procedure of step S33 and subsequent steps on the verification item 35 for which verification of operation has not been performed. On the other hand, in response to determining that the operation verification is completed for all the verification items 35 (step S40: Yes), the debugging control unit 24 stops the simulator 13 in step S41. The debugging control unit 24 stops the simulator 13 by sending a stop command to the simulator 13 via the simulator transmission/reception unit 27. Thus, the debugging control unit 24 ends the operation with the procedure illustrated in FIG. 13.

Next, display by the verification result display unit 25 will be described. FIG. 14 is a diagram illustrating an example of a verification result display screen implemented by the verification result display unit 25 illustrated in FIG. 2. The verification result display screen is a screen that displays results of verification of operation. For verification of operation with the procedure illustrated in FIG. 12, the verification result display unit 25 displays the verification result display screen when the procedure of steps S11 to S19 is completed. For verification of operation with the procedure illustrated in FIG. 13, the verification result display unit 25 displays the verification result display screen when the procedure of steps S31 to S39 is completed.

The verification result display screen has a verification result display field and a verification pattern display field. In the verification result display field, the result of verification of operation for each verification item 35 is displayed. In the verification result display field, for example, a verification item list similar to that in FIG. 10 and the result of verification of operation for each verification item 35 are displayed.

In the verification pattern display field, the result of operation verification for each verification pattern 33 is displayed. In the verification pattern display field, a verification pattern list similar to that in FIG. 9 and the result of operation verification for each verification pattern 33 are displayed. In the verification result display field and the verification pattern display field, the results of operation verification are displayed by means of color coding of the fields. Information indicating the results of verification of operation may be displayed on the verification result display screen. The results of verification of operation may be displayed in any manner that allows the results to be visually confirmed. The operator can easily confirm the results of verification of operation from the verification result display screen.

According to the first embodiment, the debugging support device creates the verification item 35 including the input label setting value 41 and the output label setting value 43, and verifies operation of the module program 31 based on the verification item 35. The debugging support device can freely set a value for each of the input label setting value 41 and the output label setting value 43, thereby enabling debugging with a high degree of freedom. The debugging support device can specify both the input label setting value 41 and the output label setting value 43, and thus can verify whether the operation is normal and whether the operation is anomaly. The debugging support device can create the verification item 35 by inputting a value, and thus can easily and efficiently create the verification item 35. The debugging support device can improve the efficiency of debugging work as compared with the case where it is necessary to describe processing for verification in a script language or the like in advance.

The debugging support device automatically compares the output value of the module program 31 with the output label setting value 43 in accordance with the setting class 44, and obtains the result of operation verification according to the verification class 34. The debugging support device can easily obtain the result of operation verification as compared with the case where an output value expected from the specified input value is not set and operation is verified only from the monitored output value. In addition, the operator can easily confirm the result of operation verification output by the debugging control unit 24 on the verification result display screen. As a result, the debugging support device can achieve an improvement in the efficiency of work for debugging.

Since the debugging support device can store the verification pattern file 32 not only in the internal storage unit 28 but also in the external storage unit 29, the verification pattern file 32 can be shared by a plurality of operators. Since the verification pattern file 32 can be shared by a plurality of operators, the plurality of operators can easily share the debugging. In addition, when the verification pattern 33 is created in considering the dependence relationship between the module programs 31 in the sequence program 30, it is possible to prevent incomplete verification due to sharing of tasks of debugging among a plurality of operators, and it is therefore possible to achieve comprehensive debugging.

In the verification of operation of the module program 31, the module program 31 can be executed not only in the PLC 12 but also in the simulator 13. The use of the simulator 13 enables the debugging support device to verify the operation in the background, leading to a reduction in the man-hours required for debugging. In the operation verification of the module program 31, the operator can freely select the PLC 12 or the simulator 13 to cause the selected one to execute the module program 31.

Note that a plurality of computers 10 in each of which the debugging support tool 11 is installed are used for the sharing of tasks of debugging among a plurality of operators. In this case, the plurality of operators can debug the sequence program 30 using computers 10 different with each other. Alternatively, tasks of debugging may be shared among a plurality of operators who use a computer 10 in which the debugging support tool 11 is installed. In either case, the tasks are shared by a plurality of operators, so that the efficiency of debugging can be improved.

As described above, according to the first embodiment, the debugging support tool 11 and the debugging support device can achieve the effect of enabling efficient debugging of a sequence program.

Second Embodiment

Figure 15:
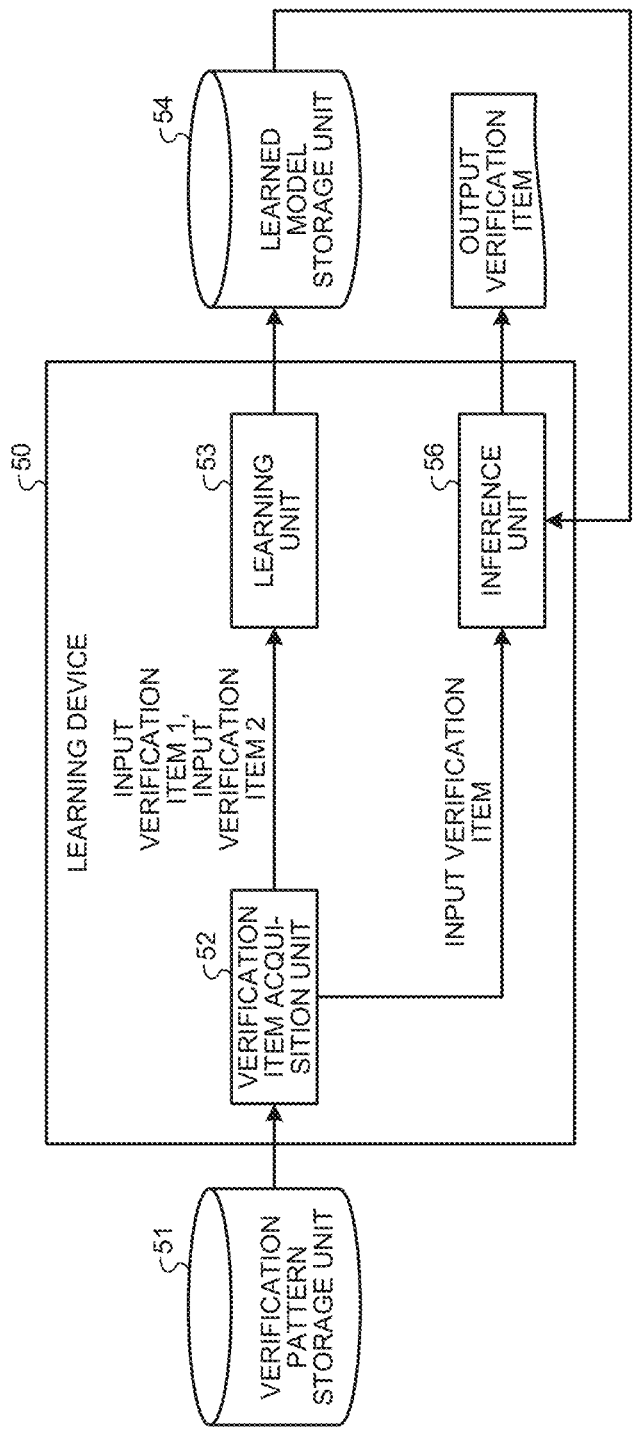
FIG. 15 is a diagram illustrating a machine learning device according to a second embodiment.

The second embodiment describes an example where machine learning is used for creating the verification items 35. FIG. 15 is a diagram illustrating a machine learning device according to the second embodiment. A learning device 50, which is the machine learning device according to the second embodiment, learns the verification item 35 to be used for verification of operation of the module program 31 in supporting debugging of the sequence program 30 by the debugging support tool 11.

The learning device 50 includes a verification item acquisition unit 52, a learning unit 53, and an inference unit 56. The verification item acquisition unit 52 acquires the verification item 35 from a verification pattern storage unit 51 outside the learning device 50. The verification pattern storage unit 51 is the internal storage unit 28 or the external storage unit 29 illustrated in FIG. 2.

The learning unit 53 generates a learned model for inferring an output verification item using a data set including two input verification items that are the verification items 35 input from the verification item acquisition unit 52. "Input verification item 1" is the first input verification item out of the two input verification items. "Input verification item 2" is the second input verification item out of the two input verification items. Among the label names of the input labels or the label names of the output labels defined in the verification items 35 of "input verification item 1" and "input verification item 2", at least one label name matching each other is included. The output verification item is a new, optimal verification item 35 to be used for verification of operation. A learned model storage unit 54 stores the generated learned model. In FIG. 15, the learned model storage unit 54 is a storage unit outside the learning device 50. The learned model storage unit 54 may be provided inside the learning device 50.

The inference unit 56 receives an input verification item from the verification item acquisition unit 52, and infers an output verification item using the learned model. The inference unit 56 outputs an output verification item in response to an input verification item being input to the learned model.

The learning unit 53 learns the input verification items through what is called supervised learning according to, for example, a neural network model. The neural network of the learning unit 53 learns the features of the input verification items by what is called supervised learning according to the created data set. Here, supervised learning refers to a model that provides input-result data pairs to the learning device 50 so that features in the data sets can be learned, and estimates results from inputs.

A data set includes an input and a label, i.e. a result corresponding to the input. Here, "input verification item 1" corresponds to an input, and "input verification item 2" corresponds to a label. The neural network includes an input layer composed of a plurality of neurons, a hidden layer, i.e. an intermediate layer composed of a plurality of neurons, and an output layer composed of a plurality of neurons. The number of intermediate layers may be one or two or more.

Figure 16:
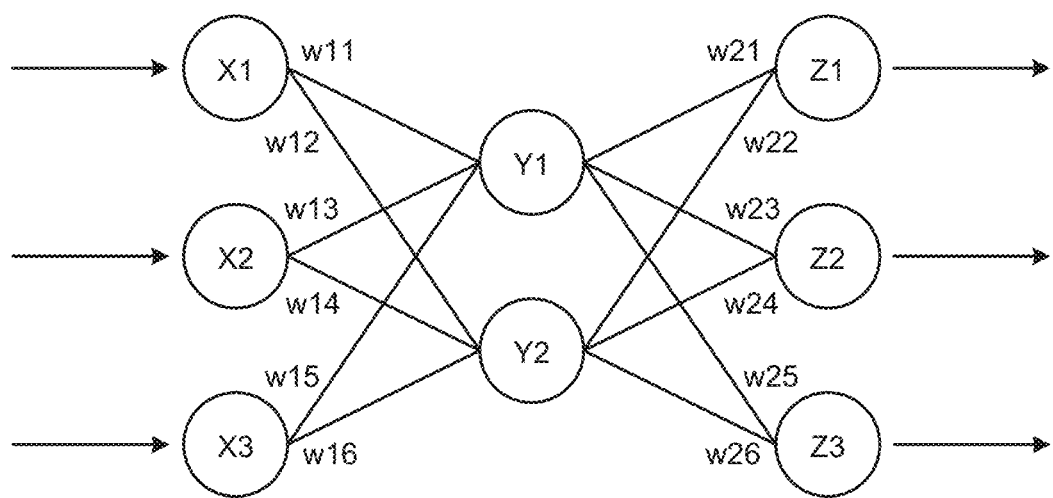
FIG. 16 is a diagram illustrating an exemplary configuration of a neural network that is used for learning in the machine learning device according to the second embodiment.

FIG. 16 is a diagram illustrating an exemplary configuration of a neural network that is used for learning in the machine learning device according to the second embodiment. The neural network illustrated in FIG. 16 is a three-layer neural network. The input layer includes neurons X1, X2, and X3. The intermediate layer includes neurons Y1 and Y2. The output layer includes neurons Z1, Z2, and Z3. Note that each layer may include any number of neurons. A plurality of values input to the input layer are multiplied by weights W1, i.e. w11, w12, w13, w14, w15, and w16, and input to the intermediate layer. A plurality of values input to the intermediate layer are multiplied by weights W2, i.e.

w21, w22, w23, w24, w25, and w26, and output from the output layer. The output results output from the output layer vary according to the values of the weights W1 and W2.

The learning unit 53 creates a data set based on a combination of "input verification item 1" and "input verification item 2". The neural network learns the output verification item by what is called supervised learning according to the created data set. That is, the neural network learns the output verification item by adjusting the weights W1 and W2 such that the result output from the output layer in response to the input of "input verification item 1" to the input layer approaches "input verification item 2". The learning device 50 executes learning in the above-described manner to generate a learned model, and stores the learned model in the learned model storage unit 54.

The inference unit 56 acquires the learned model from the learned model storage unit 54. The inference unit 56 inputs an input verification item to the learned model to output the output verification item inferred from the input verification item.

The learning device 50 is not limited to one that infers an output verification item using the learned model generated by the learning unit 53 in the learning device 50. The learning device 50 may acquire a learned model created outside the learning device 50, and infer an output verification item using the acquired learned model.

In the second embodiment, the function of the learning device 50 is incorporated in the debugging support tool 11. That is, the learning device 50 is provided inside the debugging support device. The learning device 50 may be a device existing on a cloud server that can communicate with the debugging support device.

According to the second embodiment, the learning device 50 can create an output verification item that is a new verification item 35 from an input verification item that is an existing verification item 35.

Figure 17:
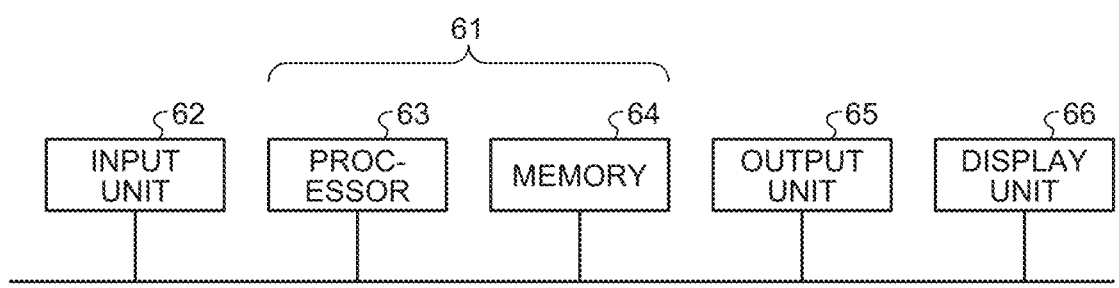
FIG. 17 is a diagram illustrating an exemplary configuration of hardware for implementing the debugging support device according to the first embodiment.

Next, hardware for implementing the debugging support device according to the first embodiment will be described. FIG. 17 is a diagram illustrating an exemplary configuration of hardware for implementing the debugging support device according to the first embodiment. The hardware illustrated in FIG. 17 is, for example, a computer 10. FIG. 17 illustrates a configuration in which the main parts of the debugging support device, specifically, the input/output label extraction unit 20, the verification item display editing unit 21, the verification pattern display editing unit 22, and the debugging control unit 24, are implemented by processing circuitry 61 including a processor 63 and a memory 64.

An input unit 62 is a circuit that receives an input signal to the debugging support device from the outside. The input unit 62 serves to receive the module program 31, receive the verification pattern file 32 from the external storage unit 29, receive information output from the PLC 12, and receive information output from the simulator 13. An output unit 65 is a circuit that outputs a signal generated by the debugging support device to the outside. The output unit 65 serves to transmit the verification pattern file 32 to the external storage unit 29, transmit the module program 31 to the PLC 12, and transmit the module program 31 to the simulator 13. The verification pattern input/output unit 23, the PLC transmission/reception unit 26, and the simulator transmission/reception unit 27 are implemented by the input unit 62 and the output unit 65.

The processor 63 is a CPU. The processor 63 may be a computing device, a microprocessor, a microcomputer, or a digital signal processor (DSP). The memory 64 is, for example, a volatile or non-volatile memory such as a random access memory (RAM), a read only memory (ROM), a flash memory, an erasable programmable read only memory (EPROM), or an electrically erasable programmable read only memory (EEPROM, registered trademark).

When the main parts of the debugging support device are implemented by the processor 63 and the memory 64, the processor 63 executes the debugging support tool 11 in which processing for operating as the input/output label extraction unit 20, the verification item display editing unit 21, the verification pattern display editing unit 22, and the debugging control unit 24 is described, so that these units are implemented. The debugging support tool 11 is stored in the memory 64 in advance. The processor 63 reads and executes the debugging support tool 11 stored in the memory 64, thereby operating as the input/output label extraction unit 20, the verification item display editing unit 21, the verification pattern display editing unit 22, and the debugging control unit 24. The internal storage unit 28 is implemented by the memory 64.

The debugging support tool 11 need not necessarily be stored in the memory 64 in advance. The debugging support tool 11 may be recorded on a storage medium readable by a computer system. The debugging support tool 11 recorded on the storage medium may be stored in the memory 64. The storage medium may be a portable storage medium which is a flexible disk or a flash memory which is a semiconductor memory. The debugging support tool 11 may be installed from another computer or a server device to the computer 10 over a communication network.

A display unit 66 is a display that displays information. The display is, for example, a liquid crystal display (LCD). The display function of the verification item display editing unit 21, the display function of the verification pattern display editing unit 22, and the verification result display unit 25 are implemented by the display unit 66.

Figure 18:
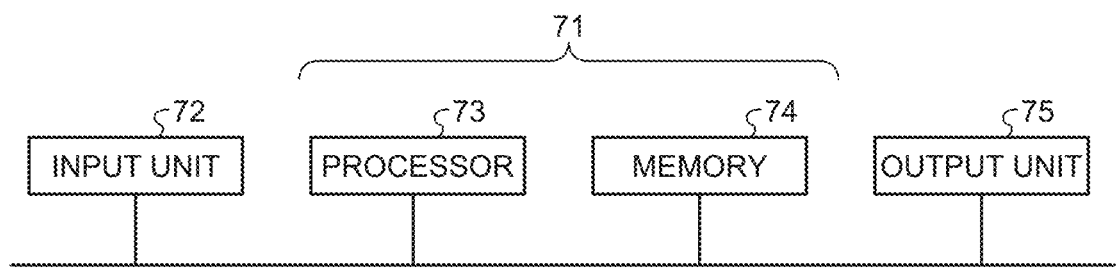
FIG. 18 is a diagram illustrating an exemplary configuration of hardware for implementing the machine learning device according to the second embodiment.

Next, hardware for implementing the machine learning device according to the second embodiment will be described. FIG. 18 is a diagram illustrating an exemplary configuration of hardware for implementing the machine learning device according to the second embodiment. FIG. 18 illustrates a configuration in which the learning unit 53 and the inference unit 56 of the learning device which is the machine learning device are implemented by processing circuitry 71 including a processor 73 and a memory 74. Note that the hardware that implements the debugging support device may also serve as the hardware that implements the machine learning device.

An input unit 72 is a circuit that receives an input signal to the learning device 50 from the outside. An output unit 75 is a circuit that outputs a signal generated by the learning device 50 to the outside. The verification item acquisition unit 52 is implemented by the input unit 72. In addition, the input unit 72 serves to input a learned model. The output unit 75 serves to output a learned model and output an output verification item.

Details of the processor 73 and the memory 74 are similar to those of the processor 63 and the memory 64 illustrated in FIG. 17. When the learning unit 53 and the inference unit 56 are implemented by the processor 73 and the memory 74, the processor 73 executes a program in which processing for operating as the learning unit 53 and the inference unit 56 is described, thereby these units are implemented. The program is stored in the memory 74 in advance. The program may be recorded on a storage medium as in the case of the debugging support tool 11.

The configurations described in the above-mentioned embodiments indicate examples of the content of the present disclosure. The configurations of the embodiments can be combined with another well-known technique. The configurations of the embodiments may be combined with each other as appropriate. Some of the configurations of the embodiments can be omitted or changed without departing from the gist of the present disclosure.

REFERENCE SIGNS LIST 10 computer; 11 debugging support tool; 12 PLC; 13 simulator; 14 virtual control network; 15 control network; 20 input/output label extraction unit; 21 verification item display editing unit; 22 verification pattern display editing unit; 23 verification pattern input/output unit; 24 debugging control unit; 25 verification result display unit; 26 PLC transmission/reception unit; 27 simulator transmission/reception unit; 28 internal storage unit; 29 external storage unit; 30 sequence program; 31 module program; 32 verification pattern file; 33 verification pattern; 34 verification class; 35 verification item; 36 input label list; 37 output label list; 38 input label setting; 39 output label setting; 40 input label; 41 input label setting value; 42 output label; 43 output label setting value; 44 setting class; 45 read timing; 50 learning device; 51 verification pattern storage unit; 52 verification item acquisition unit; 53 learning unit; 54 learned model storage unit; 56 inference unit; 61, 71 processing circuitry; 62, 72 input unit; 63, 73 processor; 64, 74 memory; 65, 75 output unit; 66 display unit.

The invention claimed is:

1. A non-transitory computer readable storage medium storing a debugging support program for causing a computer to function as a debugging support device that supports debugging of a sequence program to be executed by a control device, the debugging support program causing the computer to execute:
    extracting, from a module program constituting the sequence program, a first variable assigned to an input to the module program and a second variable assigned to an output from the module program;
    creating a verification item for verifying operation of the module program, the verification item including a first setting value specified for the first variable and a second setting value specified for the second variable;
    verifying operation of the module program by comparing a value of the second variable with the second setting value included in the verification item; and
    outputting a result of verifying operation of the module program, wherein
    the verification item includes the first setting value and the second setting value for the first variable and the second variable having a dependence relationship with each other, and
    the dependence relationship is a relationship in which a value of the second variable is determined depending on a value of the first variable.

2. The computer readable storage medium according to claim 1, wherein
    the verifying the operation includes:
    acquiring a value of the second variable obtained by executing the module program in which the first setting value is written in the first variable; and
    comparing the value of the second variable acquired with the second setting value.

3. The computer readable storage medium according to claim 2, wherein the verification item includes information on a setting class representing a method of comparing the value of the second variable with the second setting value.

4. The computer readable storage medium according to claim 1, wherein the verification item includes information on a read timing that is a timing for acquiring the value of the second variable to be obtained by executing the module program.

5. The computer readable storage medium according to claim 1, causing the computer to further execute
    creating a verification pattern in which a plurality of the verification items for verifying the operation of the module program are grouped.

6. The computer readable storage medium according to claim 5, causing the computer to further execute
    storing the verification pattern in a storage unit inside the debugging support device or outside the debugging support device, wherein
    in the verification of the operation, the operation is verified based on each of the plurality of verification items included in the verification pattern read from the storage unit.

7. The computer readable storage medium according to claim 5, wherein
    the verification of operation is classified into a first verification that is verification of normal operation and a second verification that is verification of anomaly operation,
    the verification pattern is given a verification class indicating the first verification or the second verification, and
    in the verifying the operation, the operation is verified according to the verification class.

8. The computer readable storage medium according to claim 1, wherein in the verifying the operation, the operation is verified by causing the control device to execute the module program.

9. The computer readable storage medium according to claim 1, wherein in the verifying the operation, the operation is verified by causing a simulator that simulates the control device to execute the module program.

10. The computer readable storage medium according to claim 1, causing the computer to further execute
    displaying a result of verifying the operation of the module program.

11. A debugging support device that supports debugging of a sequence program to be executed by a control device, the debugging support device comprising:
    first processing circuitry
    to extract, from a module program constituting the sequence program, a first variable assigned to an input to the module program and a second variable assigned to an output from the module program;
    to create a verification item for verifying operation of the module program, the verification item including a first setting value specified for the first variable and a second setting value specified for the second variable;
    to verify operation of the module program by comparing a value of the second variable with the second setting value included in the verification item; and
    to output a result of verifying operation of the module program, wherein
    the verification item includes the first setting value and the second setting value for the first variable and the second variable having a dependence relationship with each other, and the dependence relationship is a relationship in which a value of the second variable is determined depending on a value of the first variable.

12. A debugging support method for a debugging support device that supports debugging of a sequence program to be executed by a control device, the debugging support method comprising:

extracting, from a module program constituting the sequence program, a first variable assigned to an input to the module program and a second variable assigned to an output from the module program;

creating a verification item for verifying operation of the module program, the verification item including a first setting value specified for the first variable and a second setting value specified for the second variable;

verifying operation of the module program by comparing a value of the second variable with the second setting value included in the verification item; and outputting a result of verifying operation of the module program, wherein the verification item includes the first setting value and the second setting value for the first variable and the second variable having a dependence relationship with each other, and the dependence relationship is a relationship in which a value of the second variable is determined depending on a value of the first variable.

13. A machine learning device that learns a verification item to be used for verification of operation of a module program constituting a sequence program in supporting debugging of the sequence program by a debugging support program, the debugging support program causing a computer that functions as a debugging support device to execute:

extracting, from a module program constituting the sequence program, a first variable assigned to an input to the module program and a second variable assigned to an output from the module program;

creating a verification item for verifying operation of the module program, the verification item including a first setting value specified for the first variable and a second setting value specified for the second variable;

verifying operation of the module program by comparing a value of the second variable with the second setting value included in the verification item; and outputting a result of verifying operation of the module program, and the machine learning device comprising:

second processing circuitry to acquire the verification item; and to generate, using a data set including two input verification items that are the verification items input from the verification item acquisition unit, a learned model for inferring an output verification item from the input verification items, the output verification item being a new verification item to be used for the verification of operation.

14. The machine learning device according to claim 13, the input verification item is input to the second processing circuitry, and the second processing circuitry infers the output verification item using the learned model.

* * * * *